United States Patent [19]
Jones, Jr.

[11] Patent Number: 5,307,072
[45] Date of Patent: Apr. 26, 1994

[54] NON-CONCENTRICITY COMPENSATION IN POSITION AND ORIENTATION MEASUREMENT SYSTEMS

[75] Inventor: Herbert R. Jones, Jr., Williston, Vt.

[73] Assignee: Polhemus Incorporated, Colchester, Vt.

[21] Appl. No.: 911,204

[22] Filed: Jul. 9, 1992

[51] Int. Cl.$^5$ .............................................. G01S 3/02
[52] U.S. Cl. .................................. 342/147; 342/448; 342/443; 324/244; 324/245
[58] Field of Search ............... 342/147, 441, 442, 443, 342/445, 447, 448; 324/244, 225, 72, 247, 260, 245, 258

[56] References Cited

U.S. PATENT DOCUMENTS

| | | | |
|---|---|---|---|
| 3,432,751 | 3/1969 | Godby et al. | 324/260 |
| 3,868,565 | 2/1975 | Kuipers | 342/445 X |
| 3,983,474 | 9/1976 | Kuipers | 342/424 X |
| 3,991,361 | 11/1976 | Mattern et al. | 324/244 |
| 4,054,881 | 10/1977 | Raab | 342/448 |
| 4,116,057 | 9/1978 | Sullivan | 324/225 X |
| 4,208,024 | 6/1980 | Killpatrick et al. | 342/442 X |
| 4,287,809 | 9/1981 | Egli et al. | 324/72 X |
| 4,298,874 | 11/1981 | Kuipers | 342/463 |
| 4,314,251 | 2/1982 | Raab | 342/463 |
| 4,327,498 | 5/1982 | Setter et al. | 324/225 X |
| 4,328,548 | 5/1982 | Crow et al. | 342/451 X |
| 4,346,384 | 8/1982 | Raab | 342/451 |
| 4,394,831 | 7/1983 | Egli et al. | 324/225 X |
| 4,560,930 | 12/1985 | Kouno | 324/247 X |
| 4,613,866 | 9/1986 | Blood | 342/448 |
| 4,688,037 | 8/1987 | Krieg | 342/448 X |
| 4,710,708 | 12/1987 | Rorden et al. | 342/459 X |
| 4,737,794 | 4/1988 | Jones | 342/448 |
| 4,742,356 | 5/1988 | Kuipers | 342/448 |
| 4,849,692 | 7/1989 | Blood | 342/451 X |
| 4,945,305 | 7/1990 | Blood | 342/451 X |
| 5,170,566 | 12/1992 | Fowler et al. | 33/356 |
| 5,182,514 | 1/1993 | Rice, Jr. | 324/244 |
| 5,187,540 | 2/1993 | Morrison | 356/152 |

Primary Examiner—John B. Sotomayor
Attorney, Agent, or Firm—Price, Heneveld, Cooper, DeWitt & Litton

[57] ABSTRACT

A method and apparatus for determining the position and orientation of a remote object relative to a reference coordinate frame includes a source having a plurality of field-generating elements for generating electromagnetic fields, a drive for applying, to the generator element, signals that generate a plurality of electromagnetic fields that are distinguishable from one another, a remote sensor having a plurality of field-sensing elements for sensing the fields generated by the source, and a processor for processing the outputs of the sensing elements into remote object position and orientation relative to the source reference coordinate frame. The processor compensates the position and orientation values as a function of displacement of either the field-generating elements from a common center, or the field-sensing elements from a common center, or both. Techniques are disclosed for compensating for small-scale non-concentricity in order to overcome imperfections in the orthogonal coil sets wound on a common core, each set defining the source or the sensor. Techniques are also disclosed for compensating for large-scale non-concentricity to allow physical separation of the coil set defining the source or the sensor to dispersed locations that may be more desirable for a particular application.

21 Claims, 3 Drawing Sheets

NON-CONCENTRICITY COMPENSATION IN POSITION AND ORIENTATION MEASUREMENT SYSTEMS

BACKGROUND OF THE INVENTION

This invention relates generally to remote object position and orientation determining systems employing an electromagnetic coupling and more particularly is directed to new processing techniques for such systems.

Remote object position and orientation determining systems employing electromagnetic couplings are known in the prior art. Such systems are used for tracking and determining the position and orientation of remote objects in a wide variety of applications. Such systems traditionally have a source assembly that includes a set, typically three, generally concentrically positioned, of orthogonal field-generation antennas for generating a plurality of electromagnetic fields. Located at the remote object is a sensor having a set, also typically three, generally concentrically positioned, of orthogonal receiving antennas for receiving the electromagnetic fields generated by the transmitting antennas and producing signals corresponding to the received electromagnetic fields.

Processing algorithms for resolving the signals produced by the receiving antennas into remote object position and orientation contain implicit assumptions that the field-generation antennas are spherically concentrically positioned (meaning that their center be collocated) and that the receiving antennas are spherically concentrically positioned. These assumptions may not be warranted depending on manufacturing tolerances and on desired accuracy. Because of the manner in which coils are wound and because of practical tolerances of collocating the coils' centers or the centers of other types of magnetic field antennas, the three antennas' centers can be displaced from an intended common center by appreciable amounts. Because each field measurement data interpreted by the processing algorithm is the result of two operating coils, a source coil and a sensor coil, both of which may be experiencing non-concentricity, the opportunity for error in the position and orientation solution is very great.

Early remote sensor tracking systems, which operated within a relatively small volume of space with relatively limited sensor attitude angles, did not require exceptional accuracy. With such low performance expectations, manufacturing techniques were sufficient to keep non-concentricity deficiencies of the source and sensor within acceptable tolerances. As accuracy requirements have become more demanding and other sources of error have been eliminated or mitigated in position and orientation measurement systems, errors resulting from source and sensor non-concentricity have become a limitation of system accuracy performance. Attempts at solving non-concentricity errors by better manufacturing processes have not only proved to be ineffective but have added significant cost.

Prior art position and orientation algorithms have dictated a requirement that the centers of the coils in the coil set making up the source antennas be collocated and the centers of the coils of the coil set making up the sensor antennas be collocated. In addition to the difficulty of accurately manufacturing such devices, this places a severe constraint on source and sensor coil configuration. Other coil geometries may produce more desirable packaging.

SUMMARY OF THE INVENTION

The present invention provides a processing technique that reduces errors in position and orientation determining systems resulting from the non-concentricity of the coil set defining the source and/or the coil set defining the sensor. Advantageously, the invention provides small-scale non-concentricity compensation and large-scale non-concentricity compensation. The small-scale non-concentricity compensation accommodates imperfections in the coil sets defining the source and the sensor. The large-scale non-concentricity compensation allows physical separation of the coil set defining the source to dispersed locations that may be more desirable for a particular application. Likewise, the coil set defining the sensor may be separately located in appropriate desirable locations on the remote object.

The invention may be embodied in a system for determining the position and orientation of a remote object relative to a reference coordinate frame, having a plurality of electromagnetic field generation means and a plurality of electromagnetic field receiving means. The generation means have spatially independent components that define a source reference coordinate frame and the receiving means, which are disposed on a remote object, have spatially independent components for receiving each of the generated electromagnetic fields and define a sensor reference coordinate frame. Multiplexed electrical signals are applied to the field-generation means to generate a set of distinguishable electromagnetic fields. The electromagnetic fields are received and a set of signals is collected that is representative of the received components of the electromagnetic fields.

The invention includes processing the components of the electromagnetic fields into remote object position and orientation while compensating for displacement of the components of the field-generation means from the source reference frame and/or displacement of the plurality of receiving means from the sensor reference frame. Calibration data is gathered of the coil set defining the source or sensor during the manufacturing process and is applied in real time during execution of the processing algorithm to compensate either the sensed field data or the position and orientation solution data.

These and other objects, advantages and features of this invention will become apparent upon review of the following specification in conjunction with the drawings.

DESCRIPTION OF THE PREFERRED EMBODIMENT a) Apparatus

Figure 1:
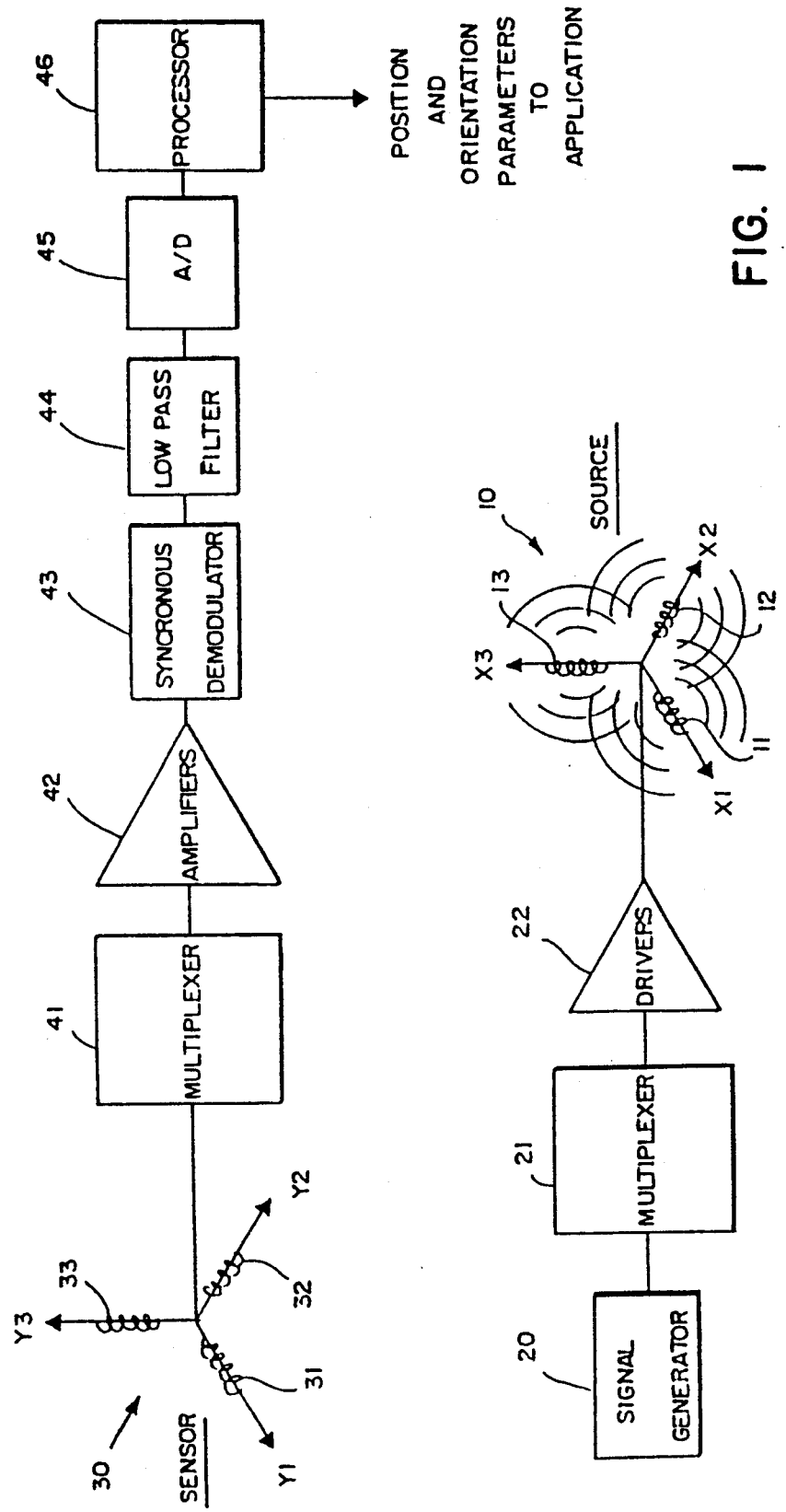
FIG. 1 is a functional diagram of a position and orientation measuring apparatus useful with the present invention.
Figure 2:
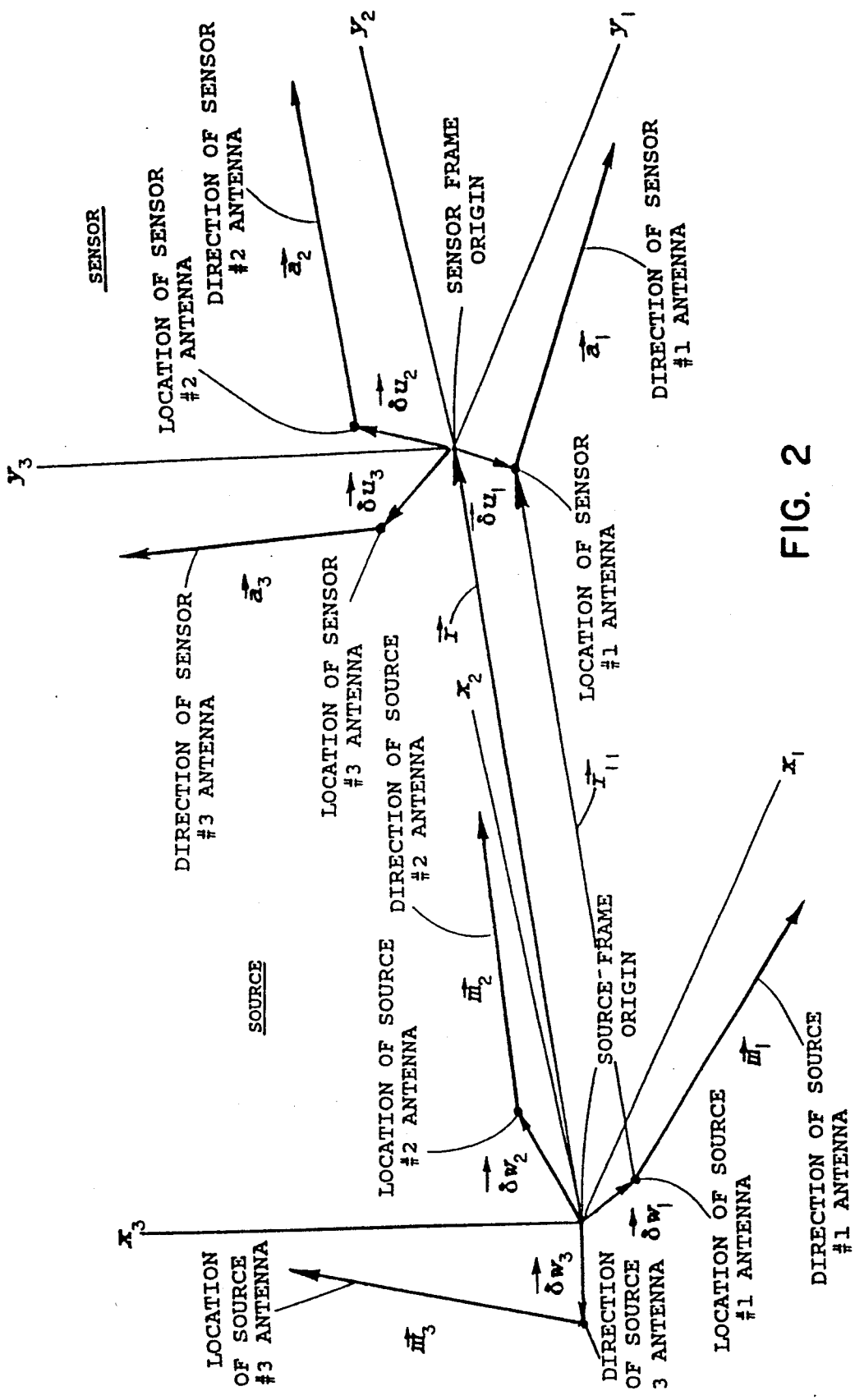
FIG. 2 is a diagram illustrating a source and a sensor in which particular coils are non-concentric and symbolic notation used in the processing strategy according to the present invention.

With reference now to FIG. 1, a functional diagram of the apparatus for determining the position and orientation of a remote object relative to a reference coordinate frame is illustrated. A source of electromagnetic field is generally illustrated at 10. The source includes a plurality of field-generation means such as generator antennas 11, 12 and 13. Generally three mutually orthogonal antennas are preferred; however, it is only necessary that no two antennas be parallel. Also it is not necessary that there be precisely three antennas in a set. In the present embodiment, the system operates in the near field. Magnetic loop antennas are provided at 11, 12 and 13 which establish quasi-stationary magnetic fields. Quasi-stationary magnetic fields are low frequency fields that vary so slowly with time that radiation effects are negligible. The three antennas 11, 12 and 13 are thus defined by the source magnetic moment vectors $\bar{m}_1$, $\bar{m}_2$, and $\bar{m}_3$ expressed in the coordinate reference frame identified by the identically orthogonal axes $\hat{x}_1$, $\hat{x}_2$, and $\hat{x}_3$ (FIG. 2). Although the present embodiment operates in the near field with loop antennas, it should be appreciated that other embodiments may operate in the far field with other transmitting means, and rotating magnets can be substituted for the near field loop antennas.

A transmitter is provided for applying electrical signals to generator antennas 11, 12 and 13 to generate a plurality of low frequency electromagnetic fields; in this case the frequencies are on the order of 10 kHz, but may be any frequency from zero to several hundred kHz. The signals are multiplexed so that the fields generated by each of the antennas are distinguishable. For example, functionally the transmitter includes a signal generator 20, a multiplexer 21 and driving amplifiers 22 for supplying power to each of the transmitting antennas 11, 12 and 13. In most current embodiments of the invention, the signal generator comprises a sine or cosine generator and the multiplexer comprises a conventional circuit for time division multiplexing the signals applied to each of the field-generating antennas. It should be understood that in this case, three driving or power amplifying circuits will be provided, each of the circuits being connected to one of the three field-generating antennas 11, 12 and 13 with the multiplexer sequentially applying an excitation signal to each of the antennas through the three individual driving circuits. However, it will be appreciated by those skilled in the art that any one of a number of suitable multiplexing techniques may be employed, including time division multiplexing, frequency division multiplexing, or phase multiplexing and a suitable transmitter for implementing such a multiplexing technique will be provided.

A sensor is provided, generally illustrated by the numeral 30, which comprises a plurality of receiving antennas 31, 32 and 33 for receiving the electromagnetic fields generated by the source 10. The receiving antennas 31, 32 and 33 are preferably loop antennas but other technology antennas such as flux gate, Hall effect, and magnetoresistive devices may be used. It is important that the receiving antenna produce an output proportional to the magnitude of the magnetic field and the cosine of the included angle between the directions of the magnetic field and the antenna axis. For a loop antenna the direction of the antenna is perpendicular to the plane of the coil with the well known right-hand-rule determining the sense. The term dipole receiving antenna is used hereafter to describe this relationship. In the present case, it is necessary that the receiving antennas 31, 32 and 33 span three dimensional space and conveniently, these antennas are disposed on three mutually orthogonal axes $\bar{a}_1$, $\bar{a}_2$, and $\bar{a}_3$, respectively. In some embodiments of the invention, it may not be preferable to use three antennas, for example, two orthogonal antennas or an antennas structure which provided the equivalent of two spatially independent components would be sufficient to create six signals from which the six degrees-of-freedom of position and orientation of the sensor 30 could be derived. However, in the present case it is considered desirable to provide three mutually orthogonal antennas to provide nine independent measures of the three electromagnetic fields generated by the source 10 from which the six independent position and orientation parameters are derived. The receiving antennas 31, 32 and 33 are thus defined by receiving vectors $\bar{a}_1$, $\bar{a}_2$, and $\bar{a}_3$ defined in a sensor reference coordinate frame identified by the identically orthogonal axes $\hat{y}_1$, $\hat{y}_2$, and $\hat{y}_3$, respectively. The outputs of the antennas 31, 32 and 33 are inputted to a multiplexer 41 which in the present case is again preferably a time division multiplexer. In the case of time division multiplexing, it is normally preferable for the multiplexer 21 and the multiplexer 41 to be controlled by a common clock signal so that, for example, when the first source antenna 11 is excited, the components of the electromagnetic field generated by the first source antenna 11 received by each of the three orthogonal receiving antennas 31, 32 and 33 are identified. The output of the multiplexer 41 is then amplified at 42 and inputted to a synchronous demodulator at 43. The synchronous demodulator 43 provides a phase sensitive technique for demodulating the carrier. That is, the detection will produce positive or negative results depending on the orientation of the receiving antenna relative to the direction of the magnetic field at the antenna. The output of the synchronous demodulator 43 goes through a low pass filter 44 which smooths the signal providing a DC output proportional to the received signal component. An analog to digital conversion is provided at 45. However, it should be appreciated that a state of the art signal processing circuit or unit could be used to replace the synchronous demodulator and the low pass filter. For example a matched-filter can be executed in a digital signal processor which accomplishes band pass filtering, synchronous demodulation, low pass filtering, and many other types of signal conditioning processes for improving the processed signal-to-noise ratio. In this case, the A/D converter would precede the processor unless the processor included an A/D converter. The signal set from the analog to digital converter 45 is then inputted to a suitable processor 46 where the position and orientation parameters of the sensor 30 relative to the source 10 are determined. Normally, the processor 46 provides the clock signals for switching the multiplexers and adjusts the gain of the amplifiers and/or drivers to provide automatic gain control.

The remote object position and orientation determining system of the present invention has a wide variety of applications. For example, the sensor 30 can be associated with the stylus of a three dimensional digitizer which is used to trace a physical model or the like and generate a digital database. The resulting database can then be used to generate a wide variety of computer generated images of the physical model. For example, the database created by tracing the physical model may be used to develop engineering and layout drawings. In plant design for example, the database may be used to compile parts lists and may interface with additional software to accomplish various engineering tasks. Applications for such three dimensional digitizers are found in such diverse industries as architectural engineering, shoe design and plastic bottle manufacturing. In another application, the digital databases created by tracing the physical models can be used to generate complex computer generated imagery in the film making art. In still another application, the sensor can be associated with a particular body part for the purpose of conducting biomechanical studies. In an important military application, the sensor is associated with the helmet and sighting reticle of the pilot of a military aircraft for determining the line of sight of the pilot to the target and thereafter initializing ordnance which is directed along the line of sight to the target. In the field of aviation generally, the system can be employed as an aircraft landing aid, the sensor being associated with the aircraft and the source reference coordinate frame being associated with a target landing area. Still another application involves the monitoring of the body movements of an invalid for the purpose of creating a nonverbal communication system or providing a technique for remotely controlling various devices with nonverbal communicative body motion. It should be appreciated that in many of these applications, the accuracy and speed of the processing technique for converting the signal set received by the remote object into remote object position and orientation is critical to the success of the application. This is particularly true, for example, in cases where the pilot of a military aircraft travelling at several hundred miles an hour is attempting to initialize ordnance to be delivered to a target within the reticle of his helmet mounted sight.

b) Processing

The following symbols are used in the present processing strategy. In the processing strategy, the source 10 is taken as origin of a cartesian coordinate reference frame, although this is not a limitation of the processing algorithm.

$\hat{x}_1, \hat{x}_2, \hat{x}_3$

A set of $3 \times 1$ unit length basis vectors that define the source reference frame. The origin of this frame coincides with the center of the source coil set.

$\hat{y}_1, \hat{y}_2, \hat{y}_3$

A set of $3 \times 1$ unit length basis vectors that define the sensor reference frame. The origin of this frame coincides with the center of the sensor coil set.

$\overline{S}$

A $3 \times 3$ signal matrix which represents a total of 9 measures of the three generated electromagnetic field vectors.

$\vec{a}_1, \vec{a}_2, \vec{a}_3$

Each a $3 \times 1$ vector having a unique point of origin translated from the sensor frame origin, representing the three sensor or receiving antenna axes. The vector directions are measured with respect to the source reference frame X. Note that both source and sensor direction axes are measured with respect to the source frame.

$\overline{A}$

A $3 \times 3$ matrix representative of the sensor orientation. It is defined by partitioning the matrix into the three sensor antenna vectors $\vec{a}_1$, $\vec{a}_2$, and $\vec{a}_3$ as follows.

$$\overline{A} = [\vec{a}_1 \vdots \vec{a}_2 \vdots \vec{a}_3]$$

$\vec{m}_1, \vec{m}_2, \vec{m}_3$

Each a $3 \times 1$ vector and each having unique point origin translated from the source's coil set origin, representing the three source or generating antenna axes. The vectors are measured with respect to the source reference frame X.

$\overline{M}$

The source moment matrix defined by partitioning $\vec{m}_1$, $\vec{m}_2$, and $\vec{m}_3$ as done above for $\overline{A}$.

$\vec{\delta u}_1, \vec{\delta u}_2, \vec{\delta u}_3$

Each a $3 \times 1$ vector that defines the position of the corresponding sensor coil with respect to the sensor frame origin. The $\vec{\delta u}$ vectors are expressed in the sensor reference frame.

$\vec{\delta u}_1', \vec{\delta u}_2', \vec{\delta u}_3'$

Same as $\vec{\delta u}$ above except that the $\vec{\delta u}'$ vectors are measured in the source reference frame.

$\vec{\delta w}_1, \vec{\delta w}_2, \vec{\delta w}_3$

Each a $3 \times 1$ vector that defines the position of the corresponding source coil with respect to the source frame origin.

$\widetilde{\delta W}$

A $3 \times 3$ matrix defined in partitioned representation as $$\widetilde{\delta W} = [\vec{\delta w}_1 \ \vec{\delta w}_2 \ \vec{\delta w}_3]$$

$\widetilde{\delta u}$

A $3 \times 3$ matrix defined in partitioned representation as $$\widetilde{\delta u} = [\vec{\delta u}_1 \vdots \vec{\delta u}_2 \vdots \vec{\delta u}_3]$$

$\vec{r}$

A $3 \times 1$ vector that defines the position of the sensor frame origin with respect to the source frame origin. The components of $\vec{r}$ are $r_1$, $r_2$, and $r_3$.

$r$

The magnitude of the vector $\vec{r}$, shown without an overhead arrow, and is equal to the square root of the sum of the squares of the vector components of $\vec{r}$.

$$r = |\vec{r}| = \sqrt{r_1^2 + r_2^2 + r_3^2}$$

$\hat{r}$

A position unit vector point from the source towards the sensor, calculated as $$\hat{r} = \frac{\vec{r}}{r}.$$

$\vec{r}_{ij}$

A $3 \times 1$ vector that defines the position of the $i^{th}$ sensor coil with respect to the $j^{th}$ source coil, for all i,j in $\{1,2,3\}$.

$r_{ij}$

The magnitude of the vector $\vec{r}_{ij}$.

$\vec{B}$

A $3 \times 1$ vector describing the magnetic B field, usually expressed in units of Tesla or Webers per square meter. $B_r$ and $B_\theta$ are the radial and tangential components when $\vec{B}$ is expressed in spherical coordinates. The cartesian components are given by $B_1$, $B_2$, and $B_3$.

$\tilde{H}$

A 3×3 field coupling matrix defined as $$\tilde{H} = \begin{bmatrix} 2 & 0 & 0 \\ 0 & -1 & 0 \\ 0 & 0 & -1 \end{bmatrix}.$$

A factor of two has been incorporated for mathematical convenience. It should be appreciated that if the system operates under other field conditions, such as far-field, this coupling will change. The formulation of such couplings is well-known by those skilled in the art; and k A constant determined by consideration of physical constants, sensor sensitivity, source magnetic moment, and amplifier gains. This constant is assumed to be unity for the simplification of the math presented.

1) Overview

In the U.S. Pat. No. 4,737,794 issued to the present inventor for a METHOD AND APPARATUS FOR DETERMINING REMOTE OBJECT ORIENTATION AND POSITION, the Disclosure which is hereby incorporated herein by reference, an aperture compensation technique is disclosed for accounting for field structures generated by other than infinitesimal dipole generating antennas and received by other than infinitesimal dipole receiving antennas. In the prior art, the physics of remote object orientation and position determining systems were described by equations modeling both source and sensor coils as infinitesimal dipoles. However, measurement errors due to this approximation become noticeable as source-sensor separation decreases and, when the aperture, or coil diameter, is comparable to the distance separating the source and sensor, equations other than an infinitesimal dipole approximation must be used to avoid measurement errors. Aperture compensation is accomplished in the Jones '794 patent by taking into account terms other than the ordinarily dominant dipole $1/r^3$ terms. Position and orientation solutions also may be compensated for field distortion resulting from fixed and moving metal objects in the vicinity of the source and sensor. According to the present invention, non-orthogonalities of the source or sensor coils can be calibrated and compensation techniques applied during processing.

The '794 patent makes reference to Arfken's *Mathematical Methods for Physicists* A. P. 1968, page 439–443, which teaches that the B field from a current loop can be expressed in spherical coordinates through the use of Legendre polynomials as follows.

$$B_r(r,\theta) = \frac{\mu_0 I}{2} \frac{a^2}{r^3} \left[ P_1 - \frac{3}{2} \left( \frac{a}{r} \right)^2 P_3 + \ldots \right] \quad (1)$$

$$B_\theta(r,\theta) = \frac{\mu_0 I}{4} \frac{a^2}{r^3} \left[ P_1^1 - \frac{3}{4} \left( \frac{a}{r} \right)^2 P_3^1 + \ldots \right] \quad (2)$$

However, a simple current-loop consists of an infinitesimally thin wire while a realizable coil has non-zero dimensions due to wire diameter. The field from a realizable coil having axial symmetry, with radius "a", height "b" and width "c" may be expressed in a similar form as follows:

$$B_r(r,\theta) = \frac{\mu_0 I}{2\pi r^3} \left[ \left( 1 + \frac{1}{12} \left( \frac{c}{a} \right)^2 \right) P_1 - \ldots - \frac{3}{2} \left( 1 + \right. \right. \quad (3)$$

$$\left. \left. \frac{1}{80} \frac{c^4}{a^4} - \frac{1}{36} \frac{c^2 b^2}{a^4} + \frac{1}{2} \frac{c^2}{a^2} - \frac{1}{3} \frac{b^2}{a^2} \right) \left( \frac{a}{r} \right)^2 P_3 + \ldots \right.$$

$$B_\theta(r,\theta) = \frac{\mu_0 I}{4\pi r^3} \left[ \left( 1 + \frac{1}{12} \left( \frac{c}{a} \right)^2 \right) P_1^1 - \ldots - \frac{3}{4} \left( 1 + \right. \right. \quad (4)$$

$$\left. \left. \frac{1}{80} \frac{c^4}{a^4} - \frac{1}{36} \frac{c^2 b^2}{a^4} + \frac{1}{2} \frac{c^2}{a^2} - \frac{1}{3} \frac{b^2}{a^2} \right) \left( \frac{a}{r} \right)^2 P_3^1 + \ldots \right.$$

In still a more general form, the B field from any axially symmetric coil can be expressed in a series expansion as follows:

$$B_r(r,\theta) = \frac{\mu_0 I c_1}{2r^3} \left[ P_1 + 2c_2 P_3 \left( \frac{1}{r} \right)^2 + 3c_3 P_5 \left( \frac{1}{r} \right)^4 + \ldots \right] \quad (5)$$

$$B_\theta(r,\theta) = \frac{\mu_0 I c_1}{4r^3} \left[ P_1^1 + c_2 P_3^1 \left( \frac{1}{r} \right)^2 + c_3 P_5^1 \left( \frac{1}{r} \right)^4 + \ldots \right] \quad (6)$$

wherein the constants $c_1$, $c_2$, and $c_3$ are determined by the particular geometry of the coil or coil set. Coils that do not possess axial symmetry can be expressed with similar series representations but involve more complex terms with ordinary Legendre functions being replaced with associated Legendre functions. The equation for the axial symmetric case is derived as normally done and aperture compensation is applied according to the constants appearing in this more general expansion. Often other than a series representation is possible with the use of elliptic integrals, hypergeometric functions, or other mathematical expressions.

In the present case, cartesian coordinates are the preferred coordinate system and substitutions are made as follows:

$$r^2 = r_1^2 + r_2^2 + r_3^2 \quad (7)$$

$$m = \pi c_1 I \quad (8)$$

$$\cos(\theta) = \frac{\vec{r} \cdot \vec{m}}{rm} \quad (9)$$

$$Q_1 = \frac{1}{\cos\theta} P_1 \quad (10)$$

$$Q_1^1 = \frac{1}{\sin\theta} P_1^1$$

$$\tilde{R} = \frac{1}{r^2} \begin{bmatrix} r_1^2 & r_1 r_2 & r_1 r_3 \\ r_1 r_2 & r_2^2 & r_2 r_3 \\ r_1 r_3 & r_2 r_3 & r_3^2 \end{bmatrix} \quad (11)$$

The vector dot product or inner product is used in equation (9); equation (11) can be written in dyadic notation as the vector outer product of the vector $\vec{r}$ with itself as follows.

$$\bar{R} = \frac{1}{r^2} \begin{pmatrix} r_1 \\ r_2 \\ r_3 \end{pmatrix} (r_1\ r_2\ r_3) = \frac{1}{r^2} \bar{rr} \quad (12)$$

The substitutions result in the following expression:

$$\vec{B} = \frac{\mu_0}{4\pi r^3} \{2\bar{R}[Q_1 + 2c_2Q_3/r^2 + 3c_3Q_5/r^4 + \ldots] + \\ + (\bar{R} - \bar{I})[Q_1{}^1 + c_2Q_3{}^1/r^3 + c_3Q_5{}^1/r^4 + \ldots]\}\vec{m} \quad (13)$$

The matrix $\bar{I}$ is the identity matrix and the magnetic moment vector $\vec{m}$ is assigned a direction perpendicular to the plane of the current loop according to the right-hand-sense rule.

The above power series may be modified to reflect non-concentricity compensation as well as aperture compensation. Indeed, field distortion effects from nearby metal objects, such as helmet mounted display components, also can be compensated in this manner. However, the technique disclosed herein is not limited to a series expansion. Use of elliptic integrals, hypergeometric functions, look-up tables, or other mathematical functions can be used to compute and compensate for any general coil configuration. Furthermore, compensation can be applied in the feedback of error terms as disclosed in the said Jones '794 patent or directly.

An examination of the B-field equations above reveals that only odd powers of $1/r$ appear because the generating and receiving coils were assumed to be situated at their respective origins and shared a common center. If the coils are offset from their respective origins, then both and even and odd powers of $1/r$ appear.

As an example, consider a source coil which is aligned with the $\theta = 0$ axis is offset from its origin along this axis by an amount $\delta r$, then the power series for the field along this axis would appear as follows:

$$B_r(r, \theta = 0) = \frac{\mu_0 I c_1}{4\pi r^3} \left[ 1 - 3\frac{\delta r}{r} + (6\delta r^2 + c_2)\left(\frac{1}{r^2}\right) + \ldots \right] \quad (14)$$

This illustrates that an offset in the coil's location produces both odd and even terms in the power series expression for the fields it produces. By reciprocity a sensing coil is seen to behave exactly the same way.

2) Non-Concentricity Parameters

Compensation of magnetic field data or of the position and orientation solutions for non-concentric sources and sensors is based upon knowledge of the relative position of each generating coil of the source triad relative to the coil set center and of each receiving coil of the sensor triad relative to its coil set center. Concentricity used in this context is specifically "spherical concentricity" having three dimensions of displacement as opposed to "axial concentricity." Therefore, the three vectors $\vec{\delta w_1}, \vec{\delta w_2}, \vec{\delta w_3}$, which define the individual positions of the source's coils relative to the source's assumed center, and the three vectors $\vec{\delta u_1}, \vec{\delta u_2}, \vec{\delta u_3}$, which define the individual positions of the sensor's coils, must be measured in order to implement compensation. Of course if there are a different number than three coils then there will be a corresponding number of position vectors. The source's assumed center may be chosen to coincide with any one of the source coil positions and the sensor's assumed center may be chosen to coincide with any of the sensor's coil positions to reduce the amount of calculations since this forces one of the three vectors to be zero by definition. Other choices of assumed centers are possible. There are many methods available for measuring the coils' relative positions. For example one method, where non-concentricity is a result of large scale displacement in the locations of the source coils and/or the sensor coils relative to their assumed centers, is to perform a simple mechanical measurement with respect to the assumed common center. However, this method may not provide sufficient accuracy in some cases and a magnetic test for coil positions may be required.

One technique for measuring source and sensor coil positions magnetically is to position the device-under-test in a gimbal and immerse the device in an AC $1/r^3$ magnetic field. By either translating or rotating the device a change in the device's output voltage will occur and be used to calculate the coil's position. If a uniform field is attempted there would be no variation in device output voltage as a function of translating or rotating the device and nothing would be learned. A procedure based on rotation is as follows. A gimbal capable of 180 degree rotation in a single axis is positioned on the axis of a transmitting coil. The gimbal's axis of rotation is perpendicular to the transmitter's axis. The point of intersection of the gimbal axis with the transmitter's coil axis is at a known distance $r_0$ from the transmitter coil. A coil-under-test is then attached to the gimbal near the said point of intersection and oriented such that its sensing axis is approximately co-axial with the transmitting coil's axis resulting in a maximum absolute coupling or mutual inductance between the two coils for the given distance $r_0$. Let $\delta r$ be the axial component of position of the coil-under-test relative to the intersection point. The object of the test is to measure $\delta r$. The first step is to measure the output voltage "$S_1$" of the coil-under-test for this first orientation. The gimbal is then rotated 180 degrees producing output voltage "$S_2$" which again is a maximum absolute coupling, but its sign is opposite from "$S_1$". The sign is reversed since in one case the sense coil was pointed towards the transmitting coil and in the other case it was pointed away. Assuming that the fields are principally $1/r^3$ behaved, then orientation 1 signal will be proportion to $(r + \delta r)^{-3}$ and signal "$S_2$" for orientation 2 will be of opposite sign and proportional to $(r - \delta r)^{-3}$ since the rotation changed the coil-under-test's axial position by 2 $\delta r$. The two relationships are shown below where "k" is a constant of proportionality that involves transmitter signal strength, receiver gain, frequency, and physical constants.

$$S_1 = \frac{k}{(r_0 + \delta r)^3} ; \quad S_2 = \frac{-k}{(r_0 - \delta r)^3} \quad (15)$$

The ratio of $\delta r / r_0$ can be easily solved and is as follows.

$$\frac{\delta r}{r_0} = \frac{\sqrt[3]{S_2} - \sqrt[3]{S_1}}{\sqrt[3]{S_2} + \sqrt[3]{S_1}} \quad (16)$$

Since $r_0$ is known, then $\delta r$ is revealed. To measure the axial distances $\delta r$ of the several coils in an antenna set, a two-axis gimbal is preferred. For example, first opposing orientations are sampled along the 1 axis of the 1 coil, then opposing orientations along the 2 axis of the 1 coil, then along the 3 axis of the 1 coil. The procedure is repeated for the 2 and 3 coils. To measure radial positions, the gimbal is located on the side of the transmitting coil and the coil-under-test axis is oriented parallel to the transmitter coil. This is best done by having a transmitting coil set and selecting a transmitting coil pointed 90 degrees away from the gimbal and coil-under-test. Since there are two components of radial position, rotations must be made about two axes. The rotation axes and the axis defined by a line connecting the transmitter coil position to the center of the gimbal must be approximately mutually orthogonal. Some orientations used to measure a component of non-concentricity of one coil are also suited for measuring a component of non-concentricity for another coil. Transmitting coils can be rotated in a similar fashion. The process reveals an axial and two radial measures of eccentricity relative to the center of rotation for each coil in the coil set. The three measurements can be expressed as three elements of a vector. For example the vector symbol $\vec{\delta w_1}$ denotes the said three eccentricity measurements for transmitting coil 1. For three transmitting coils there are three vectors $\vec{\delta w_1}, \vec{\delta w_2}, \vec{\delta w_3}$. Similarly there are three receiving vectors $\vec{\delta u_1}, \vec{\delta u_2}, \vec{\delta u_3}$ defining the eccentricities of the three receiving coils. It is important that either the rotations are made with a gimbal that has perfectly intersecting axes of rotations or if the axes are not precisely intersecting then it is important that additional rotations be made to measure gimbal intersection in the same process. Another method is to rotate to more than just two opposing angles; angles separated by less than 180 degrees can be used which over specifies the non-concentricity measurements but can be solved for a minimum variance fit using linear regression. Still another method is to translate the device-under-test along its principal axes in small increments which over specifies the solution which is solved by linear regression analysis. Still another method is to combine translation and rotation. Other alternatives will suggest themselves to the skilled artisan. For example, accurate x-ray examination, rotating the coil while powering the coil current and observing the amplitude of the generated fields, or other non-destructive testing may be adequate in particular applications for measuring the non-concentricity parameters.

3) Non-Concentricity Compensation

Once the three 3×1 source antenna position vectors $\vec{\delta w_1}, \vec{\delta w_2}, \vec{\delta w_3}$, and the three 3×1 sensor antenna position vectors $\vec{\delta u_1}, \vec{\delta u_2}, \vec{\delta u_3}$ are measured, their values are recorded and entered into the remote position and orientation measuring system which enables the system to compute either field compensation or position and orientation compensation terms for the particular source-sensor pair in use. Field compensation terms can be computed by estimating the delta signal for each of the nine signal elements. Since, in this case, there are three source and three sensing antennas, there will be, of interest, nine combinations of source-sensor coil positions. The nine combinations are calculated by subtracting a source coil position vector of interest from a rotated sensor coil position vector of interest. Sensor coil position vectors are rotated with the sensor attitude matrix $\bar{A}$ as shown. The rotated sensor coil positions are denoted with primes.

$$\vec{\delta u_1}' = \bar{A}\vec{\delta u_1}$$
$$\vec{\delta u_2}' = \bar{A}\vec{\delta u_2} \tag{17}$$
$$\vec{\delta u_3}' = \bar{A}\vec{\delta u_3}$$

The three source coil position vectors $\vec{\delta w_1}, \vec{\delta w_2}, \vec{\delta w_3}$ are then subtracted from the three rotated sensor coil position vectors $\vec{\delta u_1}', \vec{\delta u_2}', \vec{\delta u_3}'$ in the formation of the nine $\vec{\delta r_{ij}}$ vectors as follows.

$$\vec{\delta r_{ij}} = \vec{\delta u_i}' - \vec{\delta w_j}, \quad \forall \, i,j \in \{1,2,3\} \tag{18}$$

The source reference frame was chosen for convenience but any other reference frame would work as well provided all coordinates are rotated into this frame. A given vector $\vec{\delta r_{ij}}$ represents the difference between the position of the $i^{th}$ sensor coil relative to the sensor's assumed center and the position of the $j^{th}$ source coil relative to its assumed center. The vector between the sensor's assumed center and the source's assumed center is denoted as $\vec{r}$. Hence the position of the sensor's $i^{th}$ coil relative to the source's $j^{th}$ coil is given by $$\vec{r_{ij}} = \vec{r} + \vec{\delta r_{ij}} \tag{19}$$

4) Large Non-Concentricity Compensation

Large non-concentricity is suited to large scale displacement in the locations of source and/or sensor coil positions. Using an estimated source-sensor position vector $\vec{r}$, the nine positions of the $i^{th}$ sensor coil relative to the $j^{th}$ source coil, $\vec{r_{ij}}$, are calculated, then the dyadic $\bar{R}$ and the nine dyadics $\bar{R}_{ij}$ are calculated.

The relationship for remote object position and orientation analysis employing electromagnetic couplings is:

$$\bar{S} = \frac{k}{r^3} \bar{A}^t \bar{P}\bar{H}\bar{P}\bar{M} \tag{20}$$

where $\bar{P}$ represents a position matrix described with three mutually orthogonal unit vectors, one of which points at the sensor and where the "t" notation designates the transpose of a matrix. This remote object position and orientation equation is equivalent to the following from Jones '794.

$$\bar{S} = k\bar{A}^t \frac{(3\bar{R} - \bar{I})}{r^3} \bar{M} \tag{21}$$

The above equation is an expression for all nine elements of the matrix $\bar{S}$ and is only valid for perfectly concentric coils sets of receivers and transmitters. The $ij^{th}$ element of this matrix, denoted as $s_{ij}$, involves the $i^{th}$ column of the receiver matrix $\bar{A}$ denoted by the vector $\vec{a_i}$, the $j^{th}$ column of the transmitter matrix $\bar{M}$ denoted with the vector $\vec{m_j}$, the vector position of the $i^{th}$ receiving coil relative to the $j^{th}$ transmitting coil denoted with the vector $\vec{r_{ij}}$, is expressed as follows.

$$s_{ij} = k\vec{a_i}^t \frac{(3\bar{R}_{ij} - \bar{I})}{|\vec{r_{ij}}|^3} \vec{m_j} \tag{22}$$

As previously discussed the dyadic $\bar{R}$ appearing in this equation is constructed from the outer product of the vector position $r_{ij}$.

$$\bar{R}_{ij} = \frac{\vec{r}_{ij}\vec{r}_{ij}}{|\vec{r}_{ij}|^2} \quad (23)$$

Therefore the difference in the received signal $s_{ij}$ for the $i^{th}$ receiving coil and $j^{th}$ transmitting coil centered and for these coils displaced is given by the following equation.

$$\Delta s_{ij} = \vec{ka_i}\left[\frac{(3\bar{R}_{ij} - \bar{I})}{r_{ij}^3} - \frac{(3\bar{R} - \bar{I})}{r^3}\right]\vec{m}_j \quad (24)$$

Since there are nine elements, there are nine such equations. The elements found in this manner define a delta signal matrix, $\widetilde{\Delta S}$. The elements may be initially determined based on estimated position and orientation parameters as well as the measured coil positions or coil non-concentricity data. Compensation is performed by adding the delta signal matrix $\widetilde{\Delta S}$ from the received signal matrix $\widetilde{S}$ before a new position and orientation solution is begun.

Figure 3:
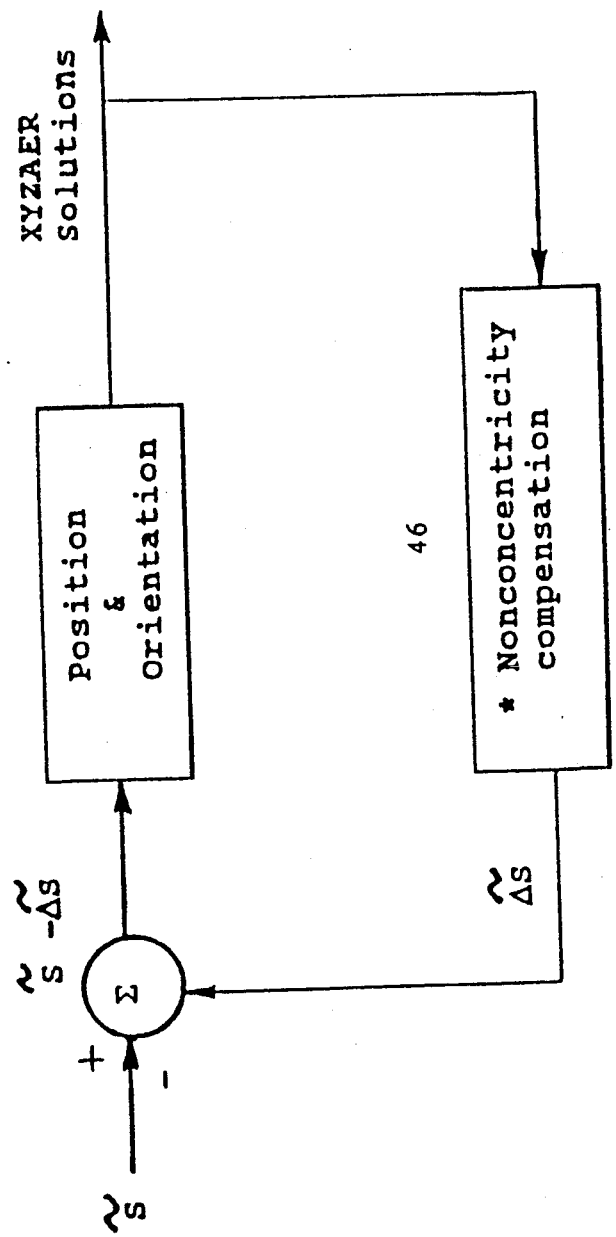
FIG. 3 is a process flow diagram according to the invention.

The process of subtracting a delta signal matrix from newly received signal matrix is illustrated in FIG. 3. Rather than correcting the elements of the received signal matrix, non-concentricity compensation may be applied directly to the position and orientation solution to correct the position in orientation parameters. Modification of the processing algorithm to apply non-concentricity compensation directly to the position and orientation solution would be within the capabilities of the skilled artisan following the teachings presented herein.

(5) Small Scale Non-Concentricity Compensation

When non-concentricities involve small displacements of the coils relative to source-to-sensor separation, a processing technique that requires fewer calculations may be applied. This technique computes the delta signal matrix elements using a Taylor series expansion. An element of the signal matrix $\widetilde{S}$ can also be written as follows. As before the element $s_{ij}$ is the signal received by the $i^{th}$ receiving coil due to the magnetic field $B_j$ generated by the $j^{th}$ source coil.

$$s_{ij} = \vec{A}_i^t \vec{B}_j \quad (25)$$

where $$\vec{B}_j = \frac{(3\bar{R} - \bar{I})}{r^3}\vec{m}_j \quad (26)$$

A change in signal due to a change in position vector $\vec{r}$ is found by taking the gradient of $s_{ij}$ with respect to $\vec{r}$ then taking the dot product of the gradient with the vector change in position, $\vec{\delta r}_{ij}$. The "ij" subscript is dropped for the next few steps of the derivation to avoid confusion. First the gradient of "s" is found.

$$\begin{aligned}\vec{\nabla}s &= \vec{\nabla}(\vec{a}^t\vec{B}) \\ &= (\vec{a}^t\vec{\nabla})\vec{B} + (\vec{B}^t\vec{\nabla})\vec{a} + \vec{a}\times(\vec{\nabla}\times\vec{B}) + \vec{B}\times(\vec{\nabla}\times\vec{a})\end{aligned} \quad (27)$$

Since the curl of $\vec{B}$ is identically zero, and all derivatives of $\vec{a}$ are zero, only the first term is non-zero.

$$\vec{\nabla}s = \left(a_1\frac{\partial}{\partial r_1} + a_2\frac{\partial}{\partial r_2} + a_3\frac{\partial}{\partial r_3}\right)\vec{B} \quad (28)$$

Here $a_1, a_2, a_3$ are the elements of the vector $\vec{a}_{ij}$, and $r_1, r_2, r_3$ are the elements of the vector $r_{ij}$. The dot product with $\vec{\delta r}_{ij}$ results in the following expression.

$$\Delta s_{ij} = \frac{3k}{r^5}\{(\vec{a}_i^t\vec{\delta r}_{ij})(\vec{r}^t\vec{m}_j) + (\vec{a}_i^t\vec{r})(\vec{\delta r}_{ij}^t\vec{m}_j) + \quad (29)$$

$$[(\vec{a}_i^t\vec{m}_j) - 5(\vec{a}_i^t\vec{r})(\vec{r}^t\vec{m}_j)](\vec{r}^t\vec{\delta r}_{ij})\}$$

As before, these elements define the correction matrix $\widetilde{\Delta S}$ to be subtracted from the received signal matrix $\widetilde{S}$ before a new position and orientation solution is begun (FIG. 3).

c) Conclusion

Thus it is seen that a processing scheme is provided that compensates for non-concentricities resulting from the manufacturing process that winds a plurality of orthogonal coils around an intended common center. Additionally, non-concentricity in the larger sense, namely, the intentional displacement of individual coils of the coil sets making up the source or sensor, may be accommodated. This imparts flexibility in the application of the source and sensor coil sets to the particular application of the position and orientation measuring system. The accommodation of large scale non-concentricities is achieved with an algorithm that requires more calculations than the algorithm for small scale non-concentricities; however, with adequate processing speeds, this difference may be negligible. There may be particular applications where it may be desirable to apply the principles of the present invention to only the coil set defining the source or only the coil set defining the sensor.

The present invention in combination with the techniques disclosed in the Jones '794 patent, reduces errors to tolerable levels resulting from the treatment from all source and sensor coils as collocated, infinitesimal dipole devices. As such, the prior constraints placed upon the construction of the devices are removed. The location of individual coils and separation distances of the source and sensor coil sets becomes less critical. It is noted that the iterative algorithm used here does not require the solution from a prior position and orientation measurement frame; however, it will converge more rapidly if it does. The principles of the invention may be implemented, however, with other processing algorithms using elliptic integrals, hypergeometric functions, look-up tables, and other mathematical expressions. Additionally, compensation for non concentricities may be applied directly to the position and orientation parameters using the teachings presented herein.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property of privilege is claimed are defined as follows:

1. An apparatus for determining the position and orientation of a remote object relative to a reference coordinate frame comprising:
   a source having a plurality of field-generating elements for generating electromagnetic fields, said generating elements having spatially independent components defining a source reference coordinate frame;
   a driver for applying to said plurality of field-generating elements signals which generate a plurality of electromagnetic fields, said electromagnetic fields being distinguishable from one another;
   a remote sensor having a plurality of field-sensing elements for sensing said generated electromagnetic fields, said sensor being disposed on a remote object and said field-sensing elements having spatially independent components for detecting each of said generated electromagnetic fields and defining a sensor reference coordinate frame; and
   a processor for processing the outputs of said field-sensing elements into remote object position and orientation relative to said source reference coordinate frame, wherein said processor compensates said position and orientation as a function of displacement of said spatially independent components of said field-generating elements from said source reference coordinate frame or of said spatially independent components of said field-sensing elements from said sensor reference coordinate frame.

2. The apparatus in claim 1 wherein said processor compensates said outputs of said field-sensing element.

3. The apparatus in claim 1 wherein said field-generating elements include a set of field-generation antenna each having a point of origin, said points of origin of said field-generating antennas being displaced from a common center and wherein said processor compensates for displacement of said points of origin of said field-generation antennas from said common center thereof.

4. The apparatus in claim 3 wherein said field-sensing elements include a set of receiving antennas each having a point of origin, said points of origin of said receiving antennas being displaced from a common center and wherein said processor compensates for displacement of said points of origin of said receiving antennas from said common center thereof.

5. The apparatus in claim 1 wherein said field-sensing elements include a set of receiving antennas each having a point of origin, said points of origin of said receiving antennas being displaced from a common center and wherein said processor compensates for displacement of said points of origin of said receiving antennas from said common center thereof.

6. The apparatus in claim 1 wherein said processor compensates said components of said outputs of said sensing elements as a function of a prior solution of remote object position and orientation.

7. The apparatus in claim 1 wherein said processor compensates said position and orientation as a function of large-scale displacement of said spatially independent components of said field-generating elements from said source reference coordinate frame or of said spatially independent components of said field-sensing elements from said sensor reference coordinate frame.

8. An apparatus for determining the position and orientation of a remote object relative to a reference coordinate frame comprising:
   a source for generating electromagnetic fields, said source having spatially independent components defining a source reference coordinate frame;
   a driver for applying to said source signals which generate a plurality of electromagnetic fields, said electromagnetic fields being distinguishable from one another;
   a remote sensor having a plurality of field-sensing antennas displaced from a sensor common center for sensing said generated electromagnetic fields, said remote sensor being disposed on a remote object and said field-sensing antennas having spatially independent components defining a sensor reference coordinate frame; and
   a processor for processing outputs of said field-sensing antenna into remote object position and orientation of said remote sensor relative to said source reference coordinate frame, wherein said processor compensates said position and orientation as a function of non-concentricity of said field-sensing antennas with respect to said sensor common center.

9. The apparatus in claim 8 wherein said source is defined by a plurality of field-generating antennas, said field-generating antennas being displaced from a source common center and wherein said processor compensates said position and orientation of said remote sensor as a function of non-concentricity of said field-generating antennas with respect to said source common center.

10. The apparatus in claim 9 wherein said processor compensates said outputs of said field-sensing antennas as a function of a prior solution of remote object position and orientation.

11. The apparatus in claim 9 wherein said processor compensates said outputs of said field-sensing antennas as a function of a prior solution of remote object position and orientation.

12. The apparatus in claim 8 wherein said processor transforms said non-concentricity of said field-sensing antennas to said source reference coordinate frame.

13. The apparatus in claim 9 wherein said processor combines in said source reference coordinate frame said non-concentricity of said field-generating antennas with said non-concentricity of said field-sensing antennas in order to determine a set of factors defining the relative position of each of said field-sensing antennas with respect to each of said field-generating antennas.

14. A method of determining the position and orientation of a remote object relative to a reference coordinate frame comprising:
   providing a source including a plurality of field-generating elements for generating electromagnetic fields, said field-generating elements having spatially independent components defining a source reference coordinate frame;
   applying multiplexed electrical signals to said field-generating elements and thus generating a set of distinguishable electromagnetic fields;
   providing a remote sensor including a plurality of field-sensing elements disposed on a remote object and having spatially independent components defining a sensor reference coordinate frame, sensing said electromagnetic fields and generating a set of signals that is representative of the sensed components of said electromagnetic fields; and processing said set of signals into remote object position and orientation in said reference coordinate frame including compensating for one of (a) displacement of at least one of said components of said field-generating elements from said source reference coordinate frame and (b) displacement of at least one of said field-sensing elements from said sensor reference coordinate frame.

15. The method in claim 14 wherein said compensating includes adjusting said set of signals that is representative of said received components of said electromagnetic fields.

16. The method of claim 14 including compensating for both (a) displacement of at least one of said components of said field-generating elements from said source reference coordinate frame and (b) displacement at least one of said field-sensing elements from said sensor reference coordinate frame.

17. The method in claim 14 including initially determining sensor displacement parameters indicative of said displacement of said component of said field-sensing elements from said sensor reference coordinate frame.

18. The method in claim 14 including initially determining source displacement parameters indicative of said displacement of said components of said field-generating elements from said reference coordinate frame.

19. The method in claim 18 including initially determining sensor displacement parameters indicative of said displacement of said component of said field-sensing elements from said sensor reference coordinate frame.

20. A method for determining the position and orientation of a remote object relative to a reference coordinate frame comprising:
providing a source including a plurality of field-generating antennas for generating electromagnetic fields, said field-generating antennas having spatially independent components defining a source reference coordinate frame;
applying multiplexed electrical signals to said field-generating antennas and thus generating a set of distinguishable electromagnetic fields;
providing a remote sensor including a plurality of field-sensing antennas disposed on a remote object and having spatially independent components for defining a sensor reference coordinate frame, sensing said electromagnetic fields and generating a set of signals that is representative of the sensed components of said electromagnetic fields;
processing said set of signals into remote object position and orientation in said reference coordinate frame including compensating as a function of non-concentricity of said components of said field-generating antennas with respect to a common center thereof or of non-concentricity of said components of said field-receiving antennas with respect to a common center thereof by:
establishing a signal matrix $\bar{S}$ representative of the received components of said electromagnetic fields;
calculating $$\Delta s_{ij} = k \bar{a}_i^t \left[ \frac{(3\tilde{R}_{ij} - \bar{I})}{r_{ij}^3} - \frac{(3\tilde{R} - \bar{I})}{r^3} \right] \bar{m}_j$$

where
k is a scalar constant;
$\bar{a}_i$ is a vector pointing along the sensor's $i^{th}$ receiving axis;

$$\tilde{R} = \frac{1}{r^2} \bar{r}\bar{r}^t;$$

$$\tilde{R}_{ij} = \frac{1}{r_{ij}^2} \bar{r}_{ij}\bar{r}_{ij}^t;$$

$\bar{r}_{ij}$ is a vector representative of the position of the sensor's $i^{th}$ coil relative to the source's $j^{th}$ coil;
$r_{ij}$ is the magnitude of the vector $\bar{r}_{ij}$;
$\bar{r}$ is a vector representative of the position of the sensor;
r is the magnitude of the vector $\bar{r}$;
$\bar{I}$ is the identity matrix;
$\bar{m}_j$ is a vector pointing along the source's magnetic moment axis;
adjusting said signal matrix as a function of 21. A method for determining the position and orientation of a remote object relative to a reference coordinate frame comprising:
providing a source including a plurality of field-generating antennas for generating electromagnetic fields, said-field-generating antennas having spatially independent components defining a source reference coordinate frame;
applying multiplexed electrical signals to said field-generating antennas and thus generating a set of distinguishable electromagnetic fields;
providing a remote sensor including a plurality of field-sensing antennas disposed on a remote object and having spatially independent components for defining a sensor reference coordinate frame, sensing said electromagnetic fields and generating a set of signals that is representative of the sensed components of said electromagnetic fields;
processing said set of signals into remote object position and orientation in said reference coordinate frame including compensating as a function of non-concentricity of said components of said field-generating antennas with respect to a common magnetic center thereof or of non-concentricity of said components of said field-receiving antennas with respect to a common magnetic center thereof by:
establishing a signal matrix $\bar{S}$ representative of the received components of said electromagnetic fields;
calculating $$\Delta s_{ij} = \frac{3k}{r^4} \{(\bar{a}_i^t \bar{o} \bar{r}_{ij})(\bar{r}^t \bar{m}_j) + (\bar{a}_i^t \bar{r})(\bar{o}\bar{r}_{ij}^t \bar{m}_j) +$$

$$[(\bar{a}_i^t \bar{m}_j) - 5(\bar{a}_i^t \bar{r})(\bar{r}^t \bar{m}_j)](\bar{r}^t \bar{o} \bar{r}_{ij})\}$$

where
k is a scalar constant;
$\bar{a}_i$ is a vector pointing along the sensor's $i^{th}$ receiving axis;

$$\tilde{R} = \frac{1}{r^2} \vec{r}\vec{r};$$

$$\tilde{R}_{ij} = \frac{1}{r_{ij}^2} \vec{r}_{ij}\vec{r}_{ij};$$

$\vec{r}_{ij}$ is a vector representative of the position of the sensor's $i^{th}$ coil relative to the source's $j^{th}$ coil;

$r_{ij}$ is the magnitude of the vector $\vec{r}_{ij}$;

$\vec{r}$ is a vector representative of the position of the sensor;

$r$ is the magnitude of the vector $\vec{r}$;

$\tilde{I}$ is the identity matrix;

$\vec{m}_j$ is a vector pointing along the source's magnetic moment axis;

adjusting said signal matrix as a function of $\Delta s_{ij}$.

* * * * *

UNITED STATES PATENT AND TRADEMARK OFFICE
CERTIFICATE OF CORRECTION

PATENT NO. : 5,307,072

DATED : April 26, 1994

INVENTOR(S) : Herbert R. Jones, Jr.

It is certified that error appears in the above-indentified patent and that said Letters Patent is hereby corrected as shown below:

Column 6, line 31:
"$[\delta\vec{w}_1 \quad \delta\vec{w}_2 \quad \delta\vec{w}_3]$" should be
--$[\delta\vec{w}_1 \; \vdots \; \delta\vec{w}_2 \; \vdots \; \delta\vec{w}_3]$--.

Column 6, line 36:
"$\delta\tilde{u} =$" should be --$\delta\tilde{U} =$--.

Column 6, line 41:
After "of" delete --are--.

Column 6, line 55:
"$\hat{r} = \dfrac{\hat{r}}{r}$" should be --$\hat{r} = \dfrac{\vec{r}}{r}$--.

Column 12, line 14:
"$\delta w_j,$" should be --$\delta\vec{w}_j,$--.

Column 12, line 19:
"$\delta r_{ij}$" should be --$\delta\vec{r}_{ij}$--.

Column 13, line 16:
"$]\tilde{m}_j$" should be --$]\vec{\tilde{m}}_j$--.

Column 13, lines 66 and 67:
"$\tilde{V}$" should be --$\vec{\tilde{V}}$-- (all occurrences).

UNITED STATES PATENT AND TRADEMARK OFFICE
CERTIFICATE OF CORRECTION

PATENT NO. : 5,307,072
DATED : April 26, 1994
INVENTOR(S) : Herbert R. Jones, Jr.

It is certified that error appears in the above-indentified patent and that said Letters Patent is hereby corrected as shown below:

Column 14, line 5:
"V" should be --$\vec{V}$--.

Column 16, line 33:
"claim 9" should be --claim 8--.

Column 18, line 27:
After "of" insert --$\Delta s_{ij}$--.

Signed and Sealed this

Tenth Day of January, 1995

Attest:

BRUCE LEHMAN

Attesting Officer

Commissioner of Patents and Trademarks